June 24, 1930.                W. B. LASKEY                1,765,873
                              CANDY MACHINERY
                           Filed July 20, 1926        6 Sheets-Sheet 1

INVENTOR
William Bartlett Laskey
BY Gustav Drews
ATTORNEY

June 24, 1930.  W. B. LASKEY  1,765,873
CANDY MACHINERY
Filed July 20, 1926  6 Sheets-Sheet 2

INVENTOR
William Bartlett Laskey
BY Gustav Drews
ATTORNEY

June 24, 1930.   W. B. LASKEY   1,765,873
CANDY MACHINERY
Filed July 20, 1926   6 Sheets-Sheet 3

June 24, 1930.  W. B. LASKEY  1,765,873
CANDY MACHINERY
Filed July 20, 1926   6 Sheets-Sheet 5

INVENTOR
William Bartlett Laskey
BY Gustav Drews
ATTORNEY

INVENTOR
William Bartlett Laskey
BY Gustav Drews
ATTORNEY

Patented June 24, 1930

1,765,873

UNITED STATES PATENT OFFICE

WILLIAM BARTLETT LASKEY, OF BROOKLYN, NEW YORK, ASSIGNOR TO MASON, AU & MAGENHEIMER CONFECTIONERY MANUFACTURING COMPANY, OF BROOKLYN, NEW YORK, A CORPORATION OF WEST VIRGINIA

CANDY MACHINERY

Application filed July 20, 1926. Serial No. 123,624.

This invention relates in general to machines for forming confections, and more especially to machines for forming confections or confection centers such as illustrated in my copending application, Serial No. 76,570, filed December 21, 1925.

Among the objects of the present invention it is aimed to provide an improved mechanism for cutting off the tops of the confection centers being formed and for returning the surplus portion cut off to the plastic mass containing tank.

To this end the present invention specifically contemplates an improved structure whereby the distance of drop between the discharge opening and the conveyor receiving the discharged units is reduced to a minimum, thereby to increase the speed of operation and at the same time facilitate receiving the units before they have had an opportunity to become distorted in the course of descent. The present invention still further aims to provide means for liberating the unit from the cut-off knives immediately after the cut-off operation to reduce the tendency of clinging to the cut-off knives to a minimum after the cut-off operation.

The present invention further contemplates an improved mechanism for preserving the lower surfaces of the confection centers formed during the forming operation, that is, to preserve such lower surface against distortion. To this end the present invention contemplates means for effecting a suction action on the unit selected before discharging the same to permit the combined closure member and scraper member to be removed without permitting the unit to descend until the positive discharging plunger is caused to operate, whereby the lower surface of the unit selected, formed by the closure member, will maintain its initially formed surface throughout its discharging action. Without such suction creating action, it has been found that as the closure member or scraper member opens to free the discharge opening, the unit will begin to drop out of the discharge opening ahead of time, and thereby, not being controlled will tend to distort the lower surface of the unit.

The present invention still further contemplates an improved structure whereby the unit discharging means and the unit gathering means will cooperate with the scraper blade to facilitate the return of the surplus material to the plastic mass receiving tank, thereby that the unit discharging means and the unit gathering means will be timed to recede to their raised position at the time that the scraper blade is caused to return the surplus material, whereby a relief in pressure will be caused to take place at the return opening and thus facilitate the reception of the material being returned by the scraper blade.

The present invention still further contemplates an improved mechanism for controlling the movement of the knives and cut-off blades and scraper blade, requiring a minimum number of operating parts and affording a construction in which the friction may be reduced to a minimum.

These and other features, capabilities and advantages of this invention will appear from the subjoined detail description of one specific embodiment thereof illustrated in the accompanying drawings, in which Figure 1 is a section on the line 1—1 of Fig. 2.

Figs. 9 and 10 are side and plan views respectively of a candy made by the present machine.

Figure 1:
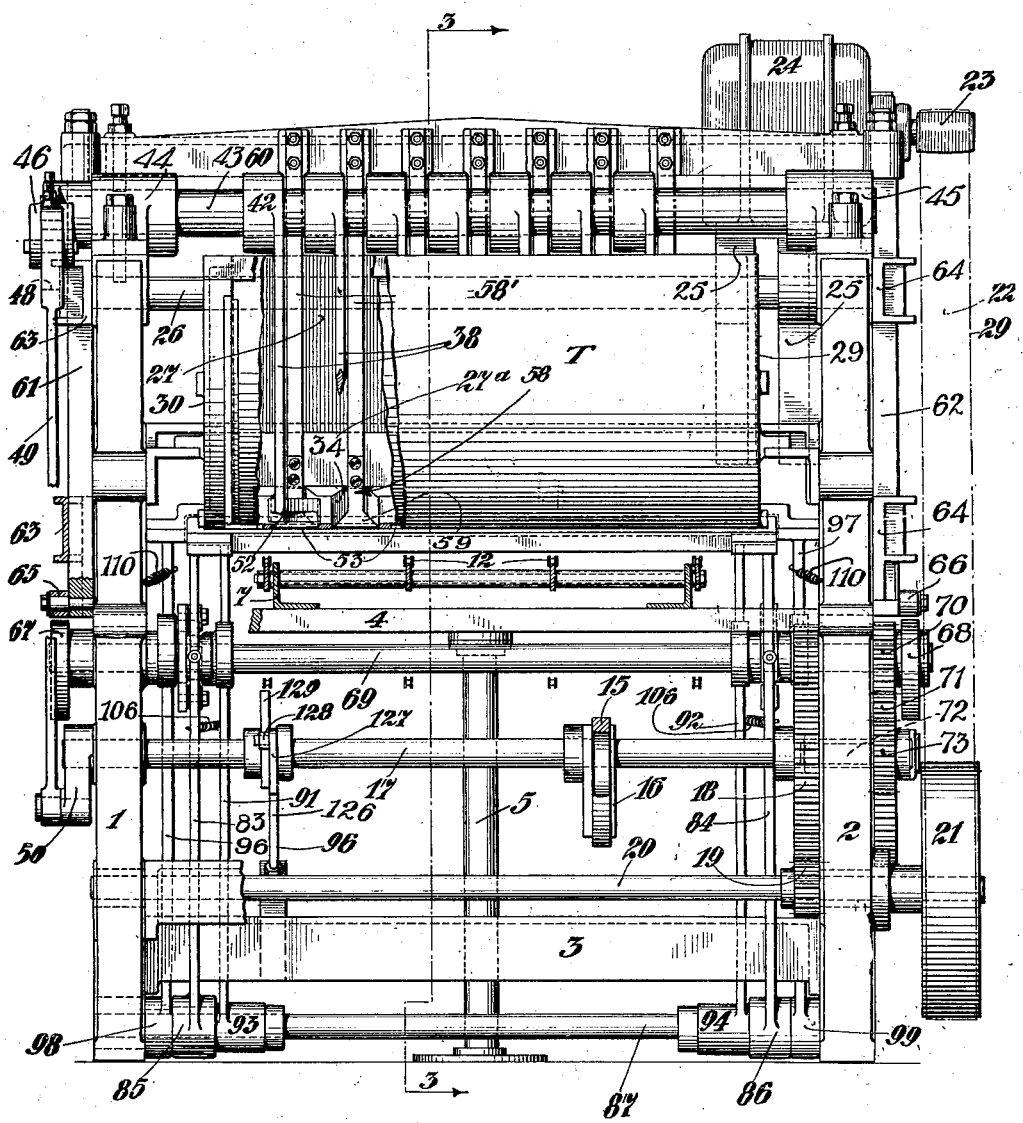
Figure 2:
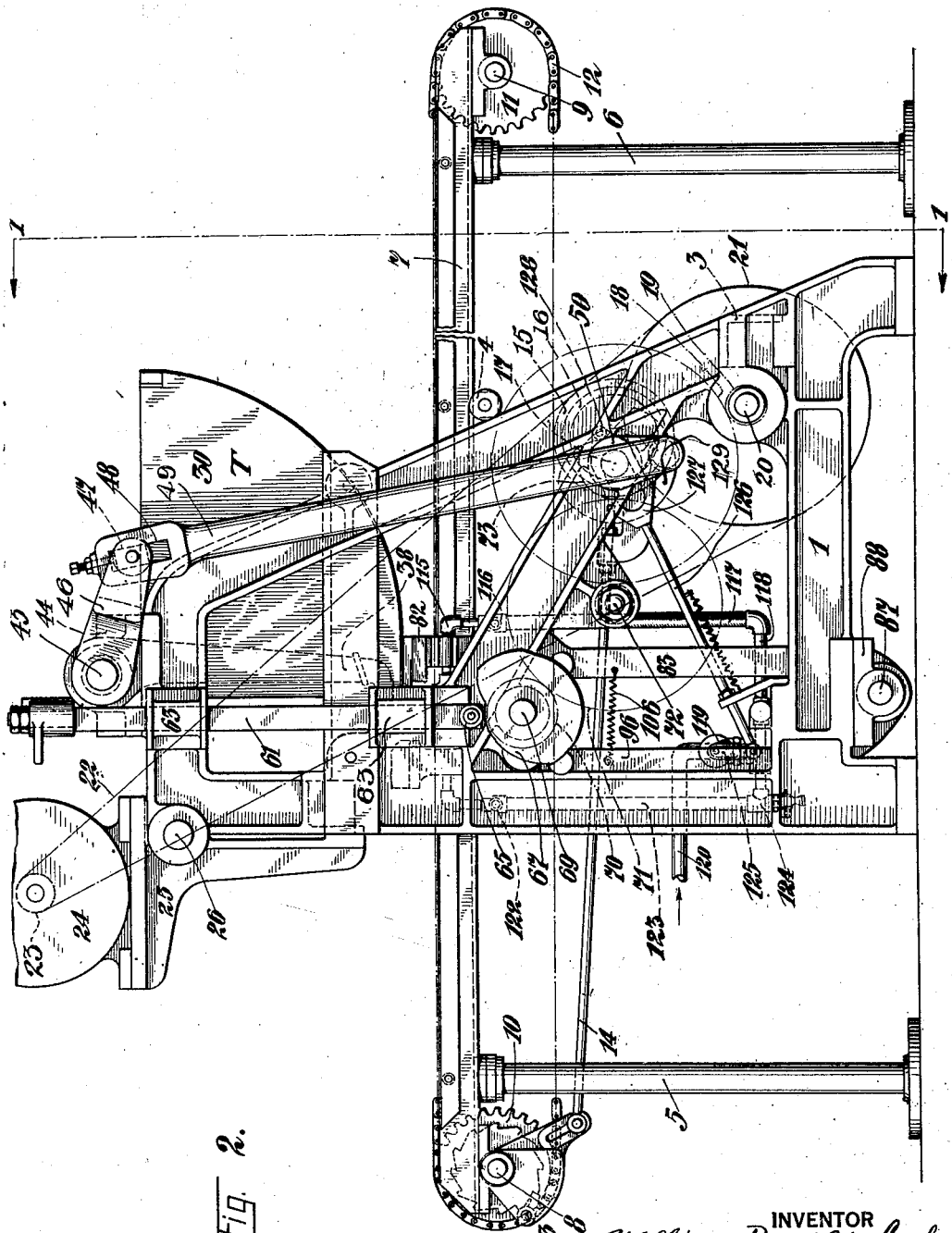
Fig. 2 is a side elevation.

As shown in Figs. 1 and 2, there are provided two side frames 1 and 2 which are suitably connected to one another at their lower ends by the cross piece 3 and at their intermediate portions by the cross bar 4. To either end of the frames 1 and 2 there are formed the standards 5 and 6 for supporting a suitable framework 7, at the ends of which beyond the standards 5 and 6 there are formed journals for the shafts 8 and 9 provided with sprocket wheels 10 and 11 by which the conveyor chain 12 is mounted and driven. The shaft 8 is provided with a suitable pawl and ratchet mechanism 13 connected by the rod 14 with the eccentric ring 15 operatively connected to the eccentric 16 fixed to the shaft 17, the shaft 17 being operatively connected by the pinion 18 in mesh with the pinion 19 on the shaft 20 which has fixed thereto the main driving pulley 21 connected by the belt 22 with the pulley 23 fixed on the shaft of the motor 24. The motor 24 may be located at any suitable place. In the present instance it is mounted on brackets 25 secured to the rod 26 which connects the side frame 2 with the side frame 1 just below the motor 24.

Above the frame 7 there is secured to the side frames 1 and 2 the plastic mass containing tank T, which in the present instance has a rear plane wall member 27, a front arcuate member 28 extending from the front upper end thereof down to the rear lower end of the wall member 27, and two plane side walls 29 and 30, the tank being open at its upper end.

In the tank T, the sides and bottoms of the confection units or confection centers are finally formed. After the confection units are discharged from the tank T, their upper surfaces are finally formed, and then the units received on tins or plates, not shown, supported on the conveyor 12 and removed thereby to the left end of the machine.

The confection units sought to be made by the present machine are such as illustrated in Figs. 9 and 10 of the drawings, to wit, having a plane lower surface p, two irregular sides each having two depressions d, d, and an irregular upper surface having two depressions d', d', continuing into one another to form substantially three bumps 31, 32 and 33.

Figure 7:
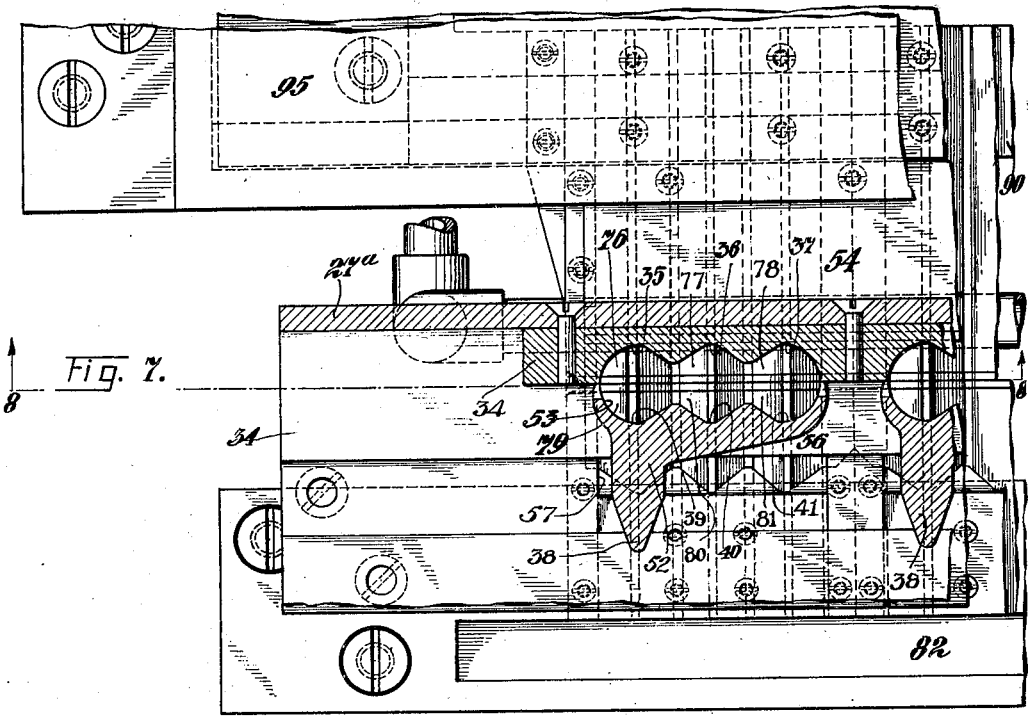
Fig. 7 is an enlarged fragmental sectional view substantially on the line 7—7 of Fig. 4.

For forming the sides of the confection units, in the present instance, there is provided a strip 34 having one side thereof formed into a plurality of die faces, seven in number, each having three depressions 35, 36 and 37, to form one of the sides of the three bumps 31, 32 and 33 of a confection unit, which strip 34 is secured to the wall 27 in any suitable manner. This die strip 34 thus forms a stationary die plate. To form the other sides of the confection units there are provided another set of die faces, seven in number, to cooperate with the die faces on the stationary die plate 34. The second set of die faces are separated from one another and formed in the lower ends of gathering arms 38. Each of these die faces also have three depressions, in the present instance, the depressions 39, 40 and 41, the die faces of the plate 34 and of the gathering arms 38 registering with one another as shown in Fig. 7 to define the lateral outlines of the confection units being formed.

The gathering arms 38 extend upwardly and continue into the hubs 42 to receive the shaft 43 which is supported in the journals 44 and 45 secured to the upper ends of the frames 1 and 2, see Fig. 1, the front end of the shaft 43 extending beyond the journal 44 and having secured thereto a rocker arm 46, the right end of which has pivotally connected thereto a slide piece 47 slidably mounted in the slot 48 formed in the upper end of the link 49 pivotally connected at its lower end to the arm 50 fixed on the shaft 17.

Figure 3:
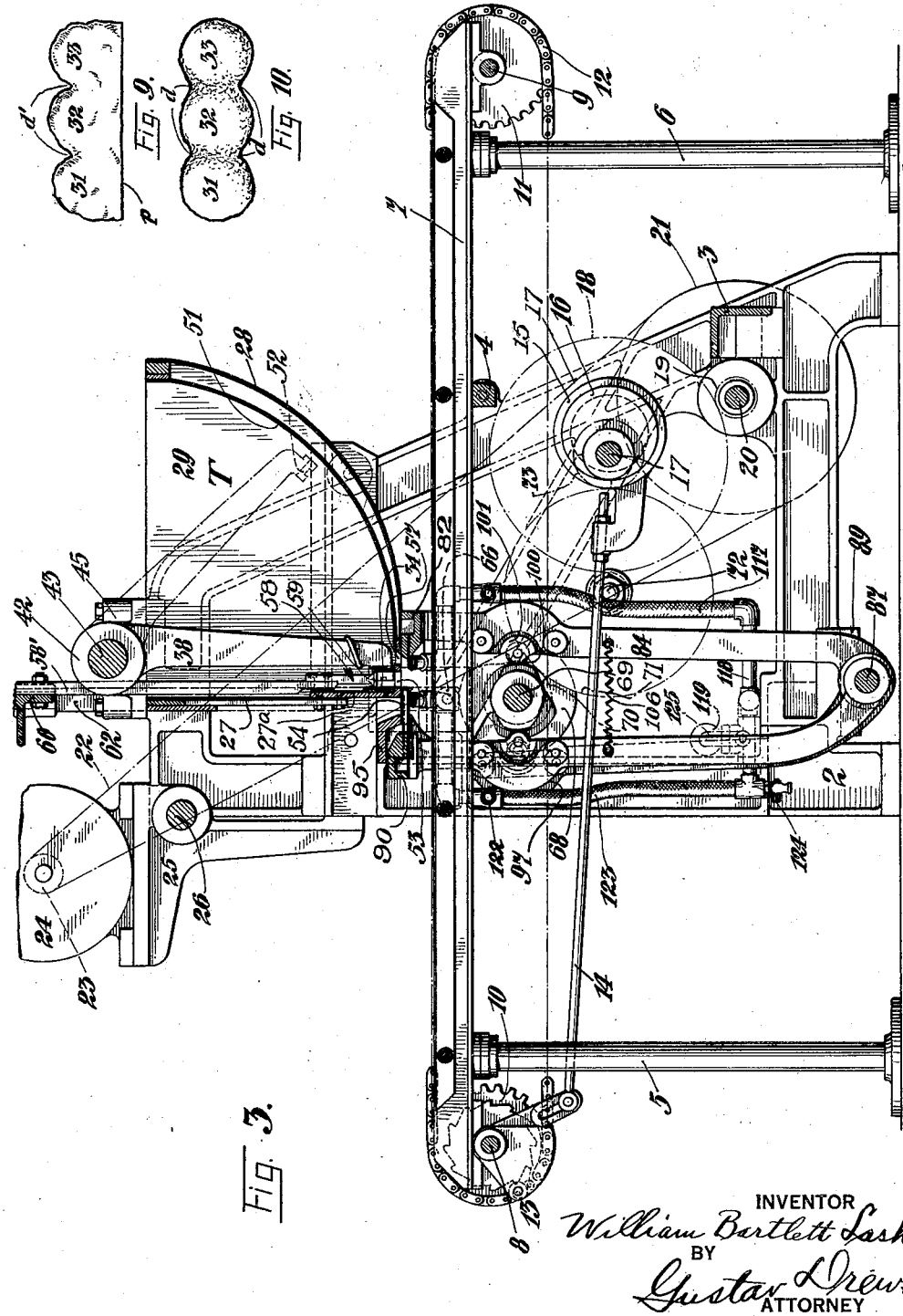
Fig. 3 is a section on the line 3—3 of Fig. 1.

It will be noted by reference to Fig. 3, that the arc of the inner face 51 of the wall 28 recedes as it extends upwardly relatively to the axis of the shaft 43 so that the space between the lower ends of the die heads 52 of the gathering arms 38 will increase as the heads 52 are swung upwardly, thereby materially reducing the friction that would result were the heads 52 moving in approximate engagement with the inner face 51 of the wall 28 throughout its arcuate movement. To facilitate the movement of the arms 38 in their downward movement, they are provided with deflecting wings or ribs 38$^a$ near their lower ends which will tend to deflect the plastic mass above the die heads 52 upwardly as the heads 52 are swung downwardly.

Figure 6:
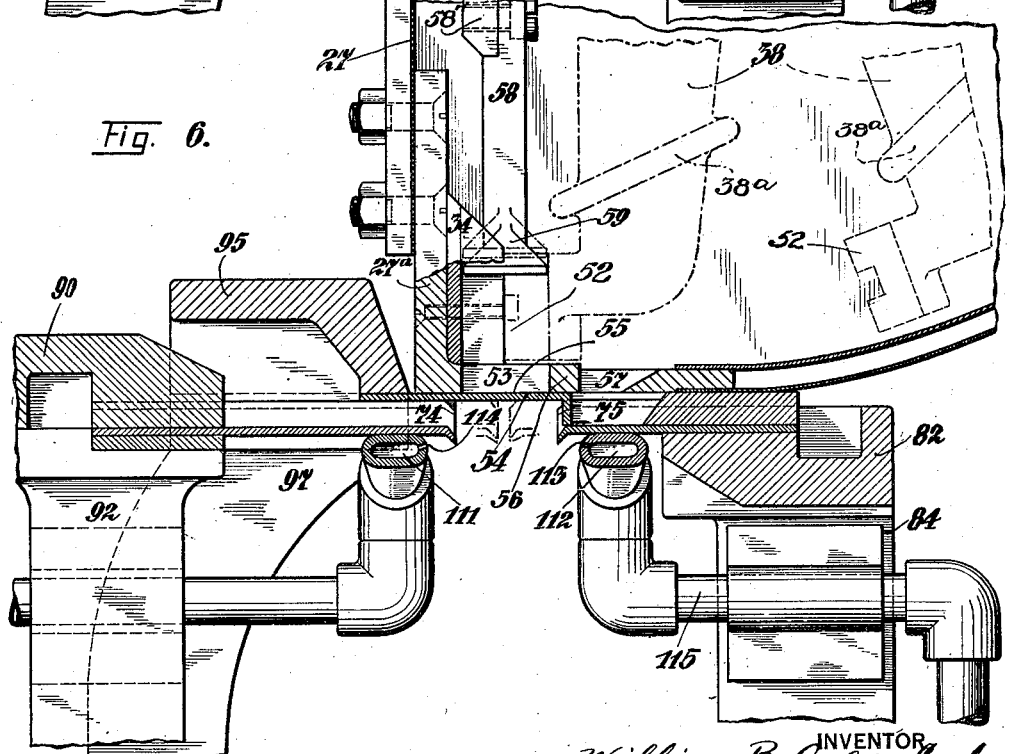

In the operation of the machine, before the heads 52 are caused to swing downwardly into engagement with the die faces on the die plate 34, the discharge openings 53 at the lower end of the tank T adjacent to the plane wall 27 will be closed by the scraper blade 54, the upper surface 55 of which is substantially plane. In the present instance as shown in Fig. 6, the closed position of the scraper blade 54 is that in which the right hand end of the blade 54 is disposed beneath the portions 56 of the lower portion 27$^a$ of the wall 27, the portions 56 separating the discharge openings 53 from the return openings 57 also formed in the portion 27$^a$. In such position of the scraper blade 54, it will be noted that the return openings 57 are left substantially unobstructed.

Figure 4:
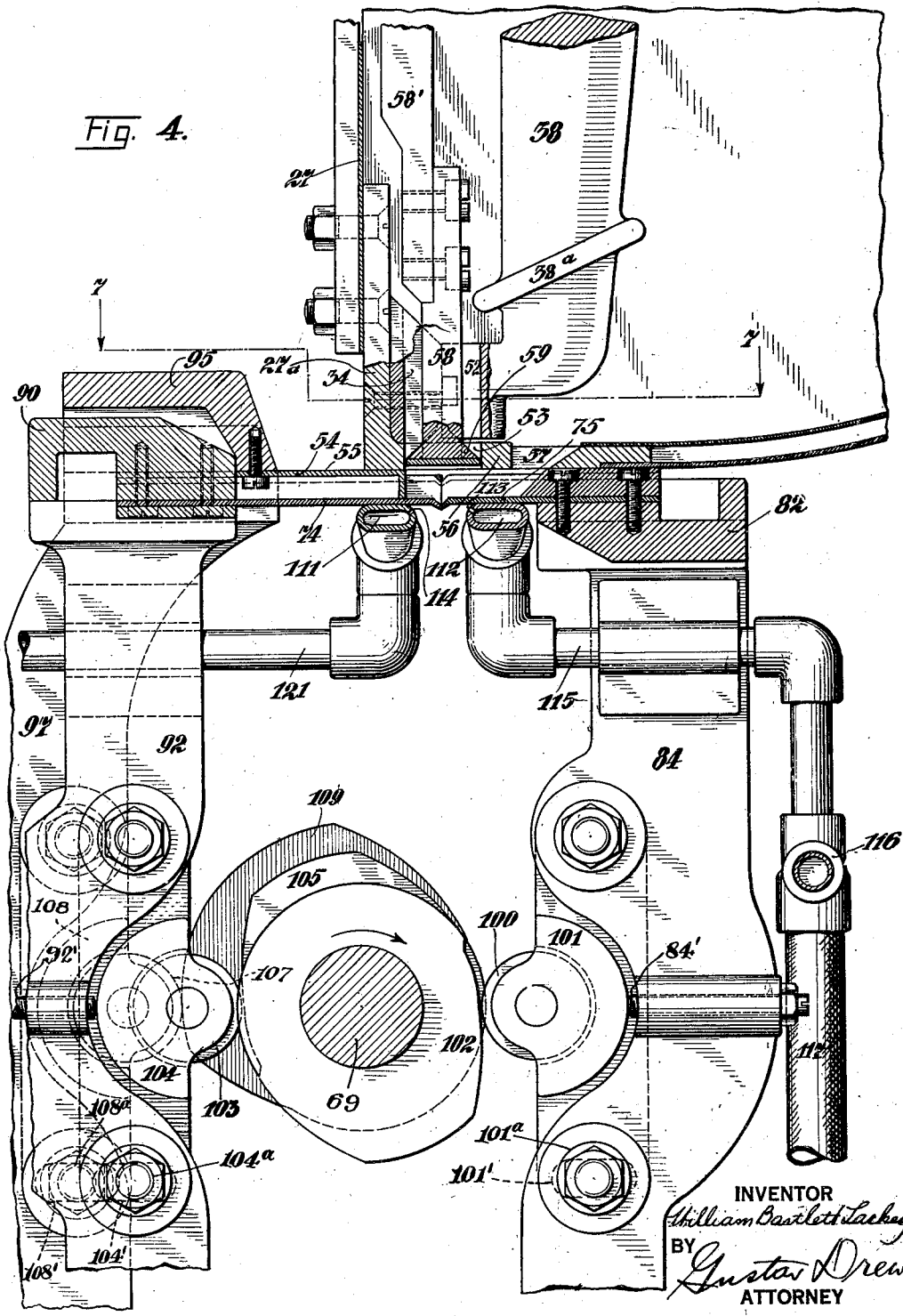
Fig. 4 is an enlarged sectional view of a portion of the machine illustrated in Fig. 3.

The scraper blade 54 will remain in the closed position shown in Fig. 6 until after the heads 52 of the gathering arms 38 have been swung into engagement with the die plate 34, see the dot and dash line position of the gathering arms 38 in Fig. 6, whereupon the plunger arms 58 will be caused initially to rise a fraction of an inch into the position indicated by the dot and dash outline of the plunger head 59 illustrated in Fig. 6, the scraper blade then caused to recede to its opened position, see Fig. 3, and the plunger arms 58 then caused to descend into the position shown in Fig. 4 to discharge the confection units out of the discharge openings 53.

The plunger heads 59 have substantially plane lower surfaces, and a lateral outline conforming to the outline defined by the die faces of the die plate 34 and the die faces of the die heads 52 when in engagement with one another, as shown in Fig. 7. The upper ends of the plunger heads 59 are secured to the flat plunger arms 58 by any suitable means. The upper portions 58' of the plunger arms 58 are composed of flat stock secured at their upper ends to the vertically extending portion of the cross bar 60, the lateral ends of which are secured to the vertically reciprocating guide bars 61 and 62, guided in their vertical reciprocation by the guide brackets 63 and 64. The lower ends of the guide bars 61 and 62 are provided with cam rollers 65 and 66 adapted to be engaged by the cams 67 and 68 secured to the ends of the shaft 69 on which is mounted the small gear 70 in mesh with the large gear 71 on the stub shaft 72. The large gear 71 meshes with the small pinion 73 on the shaft 17.

It will be noted that the cams 67 and 68 in engagement with the cam rollers 65 and 66 are formed initially to give the cam rollers 65 and 66 a short upward impulse and then to permit them to descend the fullest extent, and again to rise to their normally raised position, the cam rollers 65 and 66 in turn transmitting this action to the cross bar 60 and the plunger arms 58 secured thereto.

Before the scraper blade 54 has been withdrawn into open position, the cut-off knives 74 and 75 will then be caused to recede from one another into open position, so that when the plunger arms 58 are thereupon caused to descend, the confection units positioned beneath the plunger heads 59 will be free to be discharged out of the discharge openings 53 into position to be engaged by the cut-off knives 74 and 75.

For guiding the plunger heads 59, it will be noted that the stationary die plate 34 extends up beyond the higher-most position of the plunger heads 59 so that one side of the plunger heads will be constantly sliding in the depressions 35, 36 and 37 of the fixed die plate 34. It will also be noted by reference to Fig. 6, that when the die heads 52 of the gathering arms 38 are caused to swing downward, their upper ends will register with the edges of the plunger heads 59, so that the guiding of the plunger heads 59 will be assured.

Figure 8:
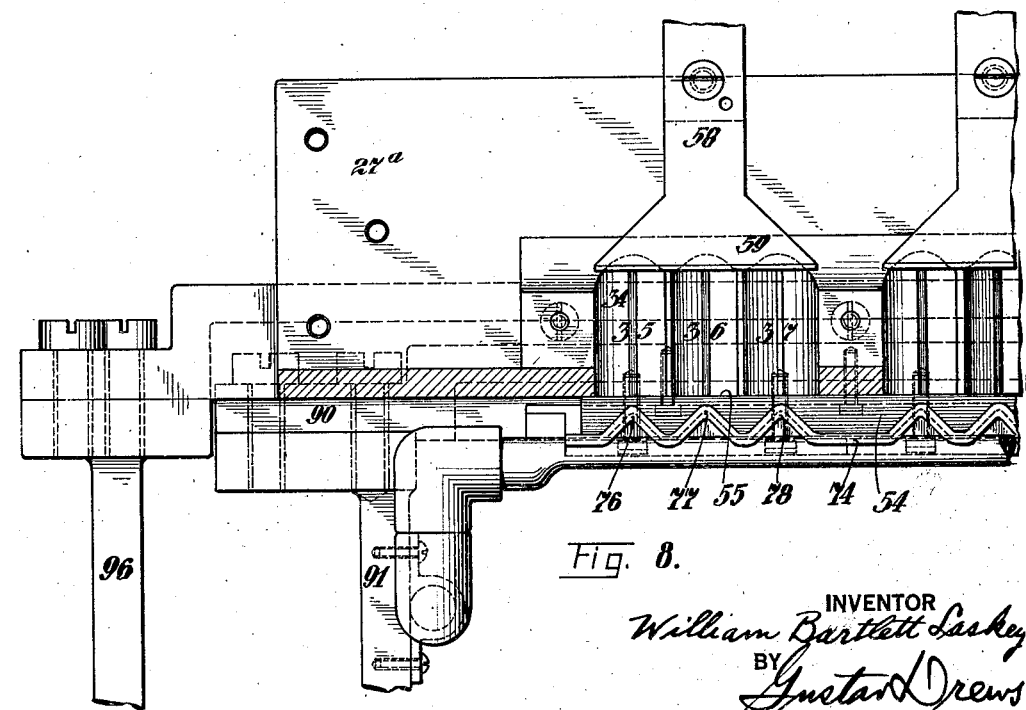
Fig. 8 is an enlarged fragmental sectional view substantially on the line 8—8 of Fig. 7.

The cut-off knives 74 and 75 are caused to approach one another as soon as the plunger arms 58 have discharged the confection units and while they are still engaged by the plunger heads 59 of the plunger arms 58. The cut-off knives will initially approach one another into the position indicated in Fig. 4 where they practically engage one another. But immediately after so engaging one another, they will recede from one another a short distance substantially into the dot and dash line position indicated in Fig. 6. The cut-off knives each have a series of upper die faces, seven in number, to correspond to the number of plunger heads 59, and number of confection units to be discharged. Each die face has three projections 76, 77 and 78, Fig. 8 showing an end elevation of the cut-off knife 74. The cut-off knife 75 is similarly shaped, see Fig. 7, with each die face having three projections 79, 80 and 81.

The projections of the knives 74 and 75 substantially register with one another, as indicated in Fig. 7, so as to form the upper surfaces of the resulting confection centers with two depressions $d'$, as illustrated in Fig. 9.

The mechanism for operating the cut-off knives 74 and 75 and the scraper blade 54 constitute a main part of the present invention. In the present invention, these cut-off knives and scraper blade are mounted on elongated arms which swing from a common center. By means of this arrangement, the mechanism for operating the cut-off knives and scraper blade is considerably simplified and reduced to a minimum number of parts, affording ready adjustment of the knives in cut-off position as well as ready adjustment of the distance throw of the knives and scraper blade by cams which are caused directly to engage and operate the arms of the cut-off knives and scraper blade. Furthermore, by mounting the cut-off knives and scraper blade on arms mounted on a single center removed a substantial distance from the lower surface of the tank T, the cut-off knives and scraper blade due to the arc described during their movement will recede from the tank T, the cut-off knives when receding from one another and the scraper blade when moving into position for freeing the discharge opening 53, thereby eliminating all friction producing guides for the knives and scraper blade such as are generally used with mechanism where the knives and scraper blade operate in parallel planes.

Each of the cut-off knives 74 and 75 and the scraper blade 54 extend the full width of the machine and are supported at their ends by the arms referred to. The mechanism for operating the arms will now be described. The cut-off knife 75 is mounted on the underslung bracket 82, the ends of which are secured to the arms 83 and 84 which extend downwardly into the hubs 85 and 86 which receive the shaft 87 mounted in the brackets 88 and 89 secured to the lower ends of the side frames 1 and 2 respectively. The knife 74 is secured to the overhanging bracket 90, the ends of which are secured to the arms 91 and 92 extending downwardly into the hubs 93 and 94 for receiving the shaft 87. The scraper blade 54 is secured to an overhanging bracket 95, the ends of which are secured to the arms 96 and 97 which extend downwardly into the hubs 98 and 99 for receiving the shaft 87. It will be noted that the brackets 90 and 95 move toward the right when swinging toward the tank T, and that the bracket 82 swings toward the left when causing the knife 75 to approach the knife 74. The arms 83 and 84 of the knife 75 are provided with cam rollers 100 which are adjustably mounted on the arms 83 and 84 by the brackets 101. The cam rollers 100 are adapted to engage the cams 102 on the shaft 69. The arms 91 and 92 are also provided with similar cam rollers 103 adjustably secured in place by brackets 104, such cam rollers 103 being adapted to engage the cams 105 also mounted on the shaft 69. Each of the arms 83, 84, 91, 92, and 96, 97, are provided with slots 101', 104' and 108' to receive the bolts 101a, 104a and 108a which anchor the lower ends of the brackets 101, 104 and 108 in place. Each of the arms 83, 84, 91, 92, and 96, 97, are also provided with positioning screws such as the screws 84' and 92' illustrated in Fig. 4. After the brackets 101, 104 and 108 are located by the screws, such as the screws 84' and 92', thereupon the lower ends of such brackets 101, 104 and 108 are fastened in such position by the bolts 101a, 104a and 108a. The cam rollers 100 and 103 are resiliently maintained in engagement with the cams 102 and 105 respectively by the springs 106, one spring connecting an arm 91 with an arm 83 and the other spring connecting an arm 92 with an arm 84. The arms 96 and 97 are also provided with cam rollers 107 secured to the arms 96 and 97 by the brackets 108. The cam rollers 107 engage cams 109 also mounted on the shaft 69. The cam rollers 107 are resiliently maintained in engagement with the cams 109 by the springs 110 which extend from the arms 96 and 97 to the side frames 1 and 2 respectively. It will be noted that the bracket 90 nests into the bracket 95 whereby, see Fig. 4, the knives 74 and 75 may be caused to approach one another and engage one another before the scraper blade 54 has started to close the discharge opening 53 and at the same time to scrape the surplus material cut off by the blades 74 and 75 through the return opening 57 into the tank T.

Each of the knives 74 and 75 have secured to their lower ends a steam supplying tube 111 and 112. The tube 112 extends the full length of the knife 75 and has a series of perforations 113 at its left hand end disposed to project steam to the lower cutting edge of the knife 75. Similarly, the tube 111 has orifices 114 at its right hand end positioned to project steam onto the lower cutting edge of the knife 74. The tube 112 is suitably secured to the arms 83 and 84 by suitable pipe fittings 115. These pipe fittings connect at a common joint 116 which is connected by a resilient conduit 117 with the conduit 118 extending to the valve 110. The valve 119 is connected by a suitable conduit 120 to the source of steam supply. Similarly, the tube 111 is connected to the arms 91 and 92 by suitable pipe fittings 121, which pipe fittings 121 are connected to a common joint 122 which is connected by a flexible conduit 123 to the conduit 124 at the lower end which connects with the valve 119. The valve 119 is provided with a control lever 125 which is connected by the rod 126 with the cam link 127, which cam link 127 has the shaft 17 pass through to guide the same and is provided with a cam roller 128 to engage the cam 129. The cam 129 is so formed and positioned relative to the cam roller 128 that it will cause the valve 119 to be opened to permit a charge of steam to be passed into the conduits 118 and 124 to be conducted to the tubes 111 and 112 to issue out of the openings 114 and 113 respectively against the knife edges of the knives 74 and 75, immediately after the knives have separated into the dot and dash line position indicated in Fig. 6, thereby to free the edges of any particles of candy confection adhering thereto.

Figure 5:
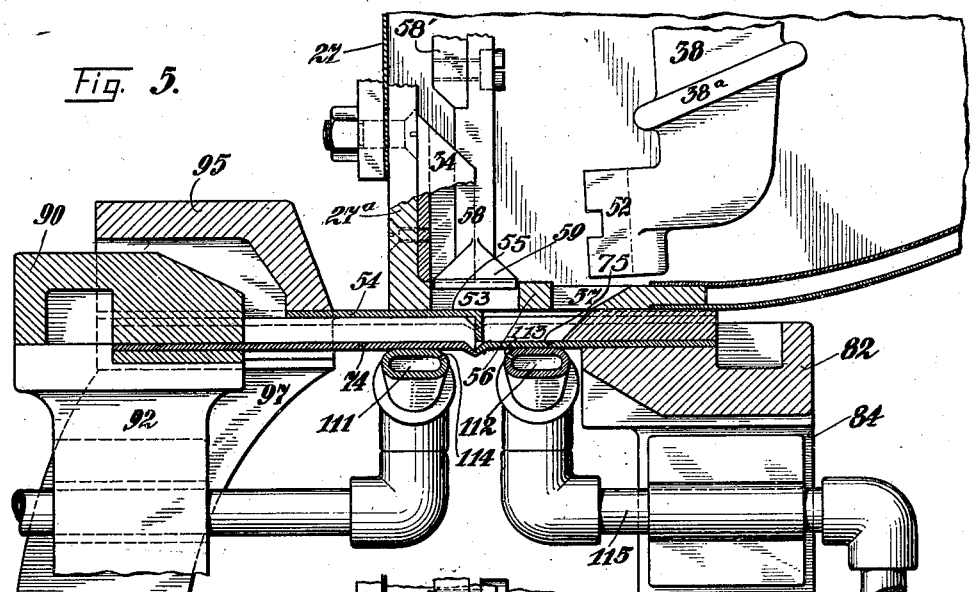
Figs. 5 and 6 are fragmental sectional views showing the successive positions of the operative parts as compared to Fig. 4.

The operation of the machine is substantially as follows: Assume the scraper blade 54 to be in closed position, that illustrated in Fig. 6, the cut-off knives 74 and 75 separated from one another in position shown in Fig. 6, and the plungers 58 with their plunger heads 59 in raised position shown in full line and the gathering arms 38 in extreme raised position, the dot and dash outline of such arms shown in Fig. 3. Thereupon the gathering arms 38 will first be caused to swing downward until their heads 52 engage the plunger heads 59, see the dot and dash outline of the gathering arms 38 in Fig. 6. Thereupon the scraper blade 54 will recede to free the discharge openings 53, and substantially at the same time, the plunger arms 58 will be caused a short upward impulse so that the heads will move into the dot and dash position shown in Fig. 6. This upward movement of the heads 59 will cause a suction effect on the confection units gathered by the gathering arms 38 to maintain such confection units in raised position while the scraper blade recedes to free the openings 53. Thereupon after the scraper blade has entirely freed the openings 53, the plunger arms will be caused to descend into the position shown in Fig. 5, and immediately thereafter and before the units have disengaged the lower surfaces of the plunger heads 59, the cut-off knives 74 and 75 will be caused to approach one another and form the upper surfaces of the confection units. Immediately after the cut-off knives have approached one another to form the upper edges, several actions take place substantially simultaneously. They are as follows:

First the scraper blade will immediately start returning the surplus material disposed on the upper surfaces of the cut-off knives 74 and 75. Simultaneously therewith and to facilitate the return of the surplus material into the tank T through the openings 57, the gathering arms 38 will swing upward and the plunger arms 58 will rise.

Simultaneously also the cut-off knives 74 and 75 will separate a short distance into the position illustrated in dot and dash outline in Fig. 6. Simultaneously therewith also the valve 119 will be actuated to cause the charge of steam to issue from the openings 113 and 114 to clear the knife edges of the cut-off knives 74 and 75 of any material that might cling thereto. The separation of the cut-off knives 74 and 75 from one another into the dot and dash outline illustrated in Fig. 6 is intended to free any particles of the confection that might be caught there between such as cocoanut shreds, nut particles and the like.

The confection units will then be received on trays or tins supported on the conveyor 12 at rest during such receiving action, and immediately after such units have been received by the conveyor the conveyor will be caused by its pawl and rachet mechanism 13 to be advanced toward the left of the machine, the distance of a little more than the length of the confection unit being formed.

Thereupon the cut-off knives 74 and 75 will recede from one another into their extreme spaced apart position, the plunger arms 58 return to the full line position illustrated in Fig. 6, and the gathering arms 38 return to the dot and dash position illustrated in Fig. 3, ready for the next cycle of operation.

From the foregoing it will be seen that by means of the overhanging brackets 90 and 95, the distance between the lower surfaces of the cut-off knives 74 and 75 and the upper surfaces of the trays on the conveyor 12 may be reduced to a minimum so that the distance of descent from the cut-off blades 74 and 75 to the trays on the conveyor may be reduced to a minimum. By this means obviously the speed of the machine may be increased and the tendency of the confections to distort while dropping from the blades to the trays be substantially eliminated.

The formation of the gathering arms 38 with their hubs 42 and heads 52 cooperates to nest the plunger arms 58 in the desired relation to the discharge openings 53 with regard to distribution of weight of the several parts properly to strengthen the same.

As shown in Fig. 1, the hubs 42 extend from the arms 38 to the front of the machine and the heads 52 extend from the arms 38 to the rear of the machine. The hubs 42 are spaced from one another on the shaft 43 to permit the plunger arms 58 to pass between the same. It will also be seen that each plunger arm 58 will be disposed adjacent to one gathering arm 38 and so arranged that its head 59 will slide adjacent to the head 52 of its adjacent gathering arm 38.

It is obvious that various changes and modifications may be made to the details of construction without departing from the general spirit of the invention as set forth in the appended claims.

I claim:

1. In a machine of the class described, the combination with a plastic mass containing tank having a vertically extending plane wall at one end and an arcuate wall at the other end extending from the upper edge of the tank down to the lower end of said plane wall, there being a discharge opening in said tank adjacent to said plane wall, of a fixed die disposed adjacent to said plane wall and in line with one side of said discharge opening for defining one side of the confection unit to be formed, a movable die adapted to move into engagement with said fixed die and into alinement with the other side of said discharge opening to define the other side of the confection unit to be formed, a closure for the discharge opening temporarily to support the confection unit being formed, a discharging head for engaging the confection unit disposed between said dies and discharging said unit through said discharge opening, and means for causing said closure to open when said discharge member functions to discharge a unit.

2. In a machine of the class described, the combination with a tank, there being a discharge opening in said tank, of a fixed die in said tank adjacent to said discharge opening and in line with one side thereof to define one side of a confection unit to be formed, a movable die operable in said tank to move in engagement with said fixed die to collect a unit of material and in alinement with the other side of said discharge opening to define the other side of the unit to be formed, a closure for said opening, means for discharging the unit located between said dies through said discharging opening, and means for actuating said closure to clear said discharge opening when said discharging means functions to discharge a unit.

3. In a machine of the class described, the combination with a plastic mass containing tank having a vertically extending plane wall at one end and an arcuate wall at the other end extending from the upper edge of the tank down to the lower end of said plane wall, there being a discharge opening in said tank adjacent to said plane wall, of a fixed die disposed adjacent to said plane wall and in line with one side of said discharge opening for defining one side of the confection unit to be formed, a movable die adapted to move into engagement with said fixed die and into alinement with the other side of said discharge opening to define the other side of the confection unit to be formed, a closure for the discharge opening temporarily to support the confection unit being formed, a discharging head for engaging the confection unit disposed between said dies and discharging said unit through said discharge opening, means for causing said closure to open when said discharge member functions to discharge a unit, a pair of cut-off knives operably mounted beneath said tank to form the upper surface of the unit being discharged, a conveyor for receiving the unit discharged and removing the unit received, and an overhanging bracket for carrying one of the knives to clear the path of movement of the unit carried by the conveyor.

4. In a machine of the class described, the combination with a plastic mass containing tank having a vertically extending plane wall at one end and an arcuate wall at the other end extending from the upper edge of the tank down to the lower end of said plane wall, there being a discharge opening in said tank adjacent to said plane wall, of a fixed die disposed adjacent to said plane wall and in line with one side of said discharge opening for defining one side of the confection unit to be formed, a movable die adapted to move into engagement with said fixed die and into alinement with the other side of said discharge opening to define the other side of the confection unit to be formed, a closure for the discharge opening temporarily to support the confection unit being formed, a discharging head for engaging the confection unit disposed between said dies and discharging said unit through said discharge opening, means for causing said closure to open when said discharge member functions to discharge a unit, a pair of cut-off knives operably mounted beneath said tank to form the upper surface of the unit being discharged, a conveyor for receiving the unit discharged and advancing it beyond the plane wall of the tank and an overhanging bracket for one of said knives operably mounted adjacent to said plane wall to clear the path of movement of the unit being received by the conveyor.

5. In a machine of the class described, the combination with a plastic mass receiving tank having a plane wall at one end and an arcuate wall at the other end extending from the upper edge of the tank down to the lower edge of said plane wall, there being a discharge opening in said tank adjacent to said plane wall, of means for discharging a unit of confection through said discharge opening, a pair of cut-off knives operably mounted beneath said tank to form the upper surface of the unit being discharged, a conveyor for receiving the unit discharged and advancing it beyond said plane wall, and an overhanging bracket for carrying the end of said cut-off knives and operable adjacent to said plane wall to clear the path of movement of the unit received by said conveyor.

6. In a machine of the class described, the combination with a tank having a plane wall at one end, an arcuate wall at the other end extending from the upper edge of the tank down to the lower end of said plane wall, there being a discharge opening in said tank adjacent to said plane wall, of means for discharging a unit of confection through said discharge opening, a pair of cut-off knives for forming the upper surface of the unit being discharged, a conveyor for receiving the unit discharged and advancing it beyond said plane wall, an underslung bracket for operably moving one of the cut-off knives actuated beneath said arcuate wall, and an overhanging bracket for operably moving the other cut-off knife and actuated adjacent to said plane wall to clear the path of movement of the unit received by said conveyor.

7. In a machine of the class described, the combination with a tank having a plane wall at one end, an arcuate wall at the other end extending from the upper edge of the tank down to the lower end of said plane wall, there being a discharge opening in said tank adjacent to said plane wall, of means for discharging a unit of confection through said discharge opening, a pair of cut-off knives for forming the upper surface of the unit being discharged, a conveyor for receiving the unit discharged and advancing it beyond said plane wall, an underslung bracket for operably moving one of the cut-off knives actuated beneath said arcuate wall, an overhanging bracket for operably mounting the other cut-off knife and actuated adjacent to said plane wall to clear the path of movement of the unit received by said conveyor, there being a return opening in said tank adjacent to said discharge opening, a scraper blade, and an overhanging bracket for operably mounting said scraper blade above said cut-off knives and actuated adjacent to said plane wall, to return the surplus material cut off by said cut-off knives into said tank through said return opening.

8. In a machine of the character described, the combination with a tank having an arcuate wall extending from the bottom thereof and extending to the upper edge thereof, there being a discharge opening at the bottom of said tank, of a fixed die in said tank adjacent to said discharge opening, a movable die, an arm secured to said movable die and pivotally connected at its upper end, said movable die passing through a path of movement adjacent to said arcuate wall, the curve of the arcuate wall receding from the path of movement as it extends upwardly, whereby the friction caused by the movement of said movable die will be reduced to a minimum, means for discharging a unit of confection disposed between said movable die and said fixed die, a closure for closing said discharge opening while said movable die moves toward said fixed die, and means for opening said closure when said discharging means functions to discharge a unit of confection.

9. In a machine of the character described, the combination with a tank having an arcuate wall, there being a discharge opening at the bottom of said tank, of a fixed die disposed along-side of said discharge opening, a movable die, an arm secured to said movable die and pivoted at its upper end to cause said movable die to travel in a path of movement adjacent to said arcuate wall, means for discharging a unit of confection located between said dies, a closure for closing said discharge opening when said movable die functions, means for opening said closure when said discharging means functions to discharge a unit, and a wing formed on said movable die disposed at an angle to its path of movement, to deflect a portion of the plastic material out of its path of movement to relieve the pressure when said movable die moves downward into engagement with said fixed die.

10. In a machine of the class described, the combination with a plastic mass receiving container having a discharge opening at its lower end, of a closure for said discharge opening, the upper surface of which serves as a support for a unit of confection to be discharged, a fixed die in said container extending upwardly from one side of said discharge opening, a movable die adapted to engage said fixed die and extend upwardly from the other side of said discharge opening, a plunger head slidably mounted between said dies to discharge the unit of material located between said dies, means for operating said closure to free the discharge opening in order to permit said plunger head to discharge the unit located between said dies, and means for causing said plunger head to rise when said closure is caused to open to effect a sucking action on the unit of material disposed between said dies temporarily to hold up the unit of material until the closure has entirely cleared the discharge opening.

11. In a machine of the character described, the combination with a plastic mass containing tank having a discharge opening at the bottom thereof, a closure for the discharge opening, a discharging plunger for extruding a unit of plastic mass located on said closure, means for causing said closure to clear said discharge opening to permit said discharging plunger to discharge the unit disposed above said closure, and means for causing said discharging plunger to effect a sucking action on the unit disposed above said closure, to hold the same against premature discharging until after said closure has entirely cleared said discharge opening.

12. In a machine of the class described, the combination with a plastic mass containing tank having a discharge opening and a surplus return opening, of a fixed die in said tank adjacent to one side of said discharge opening, a movable die operable in said tank to engage said fixed die and position a unit of material between said dies, a plunger for discharging the unit of material positioned between said dies through said discharge opening, cut-off knives operable below said discharge opening to cut off the surplus material of said unit and form the upper surface thereof, a scraper operable above said cut-off knives to return the surplus material to said tank through said return opening, and means for causing said plunger and movable die to begin its return movement when said scraper blade operates to return the surplus material thereby to relieve the pressure at said return opening.

13. In a machine of the class described, the combination with a plastic mass receiving tank, of means for discharging a unit of plastic mass from said tank, a pair of arms pivotally mounted on a common center, a cut-off knife supported on each arm, and means for causing said cut-off knives to approach one another to receive the unit discharged from said tank and cut off a portion thereof.

14. In a machine of the class described, the combination with a plastic mass containing tank, cut-off means, a shaft, arms pivotally mounted on said shaft and secured to said cut-off means to support the same, a cam, means for yieldably maintaining said arms in engagement with said cam, means for actuating said cam to cause said cut-off means to engage the unit discharged and cut a portion therefrom, and adjusting means on said arms for adjusting the distance of throw of said cut-off means.

15. In a machine of the class described, the combination with a plastic mass containing tank, cut-off means, a shaft, arms pivotally mounted on said shaft and secured to said cut-off means to support the same, a cam, means for yieldably maintaining said arms in engagement with said cam, means for actuating said cam to cause said cut-off means to engage the unit discharged and cut a portion therefrom, and an adjustable bracket on said arms cooperating with said cam to permit adjustment of the distance of throw of said cut-off means.

16. In a machine of the class described, the combination with a plastic mass containing tank, of means for discharging a unit from said tank, a pair of cut-off knives, a shaft, supporting arms pivotally connected to said shaft and supporting said cut-off knives, a cam shaft disposed between said pair of arms, cams on said cam shaft, means for yieldably maintaining said arms in engagement with said cams, and means for actuating said cam shaft and cams to cause said cut-off knives to engage the unit discharged and cut a portion therefrom.

17. In a machine of the class described, the combination with a plastic mass containing tank, of means for discharging a unit from said tank, a pair of cut-off knives, a shaft, supporting arms pivotally connected to said shaft and supporting said cut-off knives, a cam shaft disposed between said pair of arms, cams on said cam shaft, means for yieldably maintaining said arms in engagement with said cams, and means for actuating said cam shaft and cams to cause said cut-off knives to engage the unit discharged and cut a portion therefrom, said cams being formed to cause said cut-off knives immediately to recede from one another after the cut-off action to facilitate clearing the cutting edges of the knives of any material that might adhere thereto.

18. In a machine of the class described, the combination with a plastic mass containing tank, of means for discharging a unit from said tank, a pair of cut-off knives, a shaft, supporting arms pivotally connected to said shaft and supporting said cut-off knives, a cam shaft disposed between said pair of arms, cams on said cam shaft, means for yieldably maintaining said arms in engagement with said cams, means for actuating said cam shaft and cams to cause said cut-off knives to engage the unit discharged and cut a portion therefrom, and steam supplying means for issuing steam to the cutting edges of said knives immediately after the cutting action to clear the cutting edges of any material that might adhere thereto.

19. In a machine of the class described, the combination with a plastic mass containing tank, of means for discharging a unit of plastic mass from said tank, a pair of cut-off knives operating in opposition to one another, a shaft, arms pivotally mounted on said shaft and supporting said cut-off knives, cam means for causing said cut-off knives to engage the unit discharged and cut a portion therefrom to form one surface thereof, a scraper blade slidably engaging the upper surfaces of said cut-off knives, arms pivotally mounted on said shaft and supporting said scraper blade, and cam means for actuating said scraper blade arms to cause said scraper blade to engage the surplus material cut off by said cut-off knives and return it to said tank.

20. In a machine of the class described, the combination with a plastic mass containing tank having a discharge opening and a return opening, of means for discharging a unit of plastic mass from said discharge opening, a pair of cut-off knives for engaging the unit discharged and cutting off the upper portion thereof to form the upper surface of the unit discharged, a shaft, arms pivotally connected to said shaft and supporting said cut-off knives, cam means for actuating said arms to cause said cut-off knives to approach one another to perform the cutting operation, a scraper blade slidably engaging the upper surfaces of said cut-off knives, arms supporting said scraper blade and pivotally connected to said shaft, and means for actuating said scraper blade arms to cause said scraper blade to engage the surplus material cut off by said cut-off knives and return it to said tank through said return opening.

21. In a machine of the class described, the combination with a plastic mass containing tank, of means for discharging a unit of plastic mass from said tank, cut-off means, a shaft, arms pivotally mounted on said shaft and supporting said cut-off means, means for actuating said cut-off means to engage the plastic unit discharged and cutting a portion therefrom, a steam supplying conduit secured to said cut-off means, a steam valve, a flexible conduit connecting said steam supplying conduit with said steam valve, and means for controlling said steam valve to permit a charge of steam being ejected from said steam supplying conduit into engagement with said cut-off means immediately after the cut-off action to free the same of any material that might cling thereto.

22. In a machine of the class described, the combination with a plastic mass containing tank having a discharge opening at the bottom thereof, of means for discharging a unit of plastic mass through said discharge opening, a pair of cut-off knives, a shaft, arms pivotally mounted on said shaft and supporting said cut-off knives, means for causing said cut-off knives to approach one another to engage the unit discharged to cut a portion therefrom and form the upper surface thereof, a steam supplying conduit secured to each cut-off knife adjacent to the cutting edge thereof, a main steam supplying valve, a flexible conduit connecting the steam supplying conduit with said valve, and means operably connected to said valve to cause said valve to permit a charge of steam being supplied to said steam supply conduit to be ejected onto the cutting edges of the cut-off knives immediately after the cut-off action.

23. The combination with a tank, there being a discharge opening in said tank, of a fixed die disposed in alinement with one side of said discharge opening, a movable die operable in said tank to select a unit of material and locate the same adjacent to said fixed die in position to be discharged through said discharge opening, a closure for said opening, and means for actuating said closure to clear said discharge opening after said unit has been located preparatory to the discharge of the unit.

24. The combination with a tank, there being a discharge opening in said tank, of a fixed die disposed in alinement with one side of said discharge opening, a movable die operable in said tank, means for actuating said die to select a unit of plastic material and locate the same adjacent to said fixed die and adjacent to said discharge opening preparatory to discharge, and means for discharging the unit selected.

25. In a machine of the class described, the combination with a tank having a vertically extending wall, there being a discharge opening in said tank adjacent to said wall, of a selecting arm for selecting a unit of plastic material in said tank and locating the same over said discharge opening in position to be discharged therethrough, and means for discharging the unit through said discharge opening.

26. In a machine of the class described, the combination with a tank containing a mass of plastic material having a vertically extending outer wall, there being a discharge opening in said tank adjacent to the lower end of said wall, of means for extruding a portion of the plastic material contained in said tank through said discharge opening, cut-off knives for cutting a unit from said extruded portion, and an overhanging bracket carrying one of the knives to clear the path of movement of the unit being discharged.

27. In a machine of the class described, the combination with a tank containing a mass of plastic material having a vertically extending outer wall, there being a discharge opening in said tank adjacent to the lower end of said wall, of means for extruding a portion of the plastic material contained in said tank through said discharge opening, cut-off knives for cutting a unit from said extruded portion, a conveyor for receiving the unit discharged and advancing it beyond said vertically extending wall, and an overhanging bracket for supporting one of said cut-off knives and operable adjacent to said wall to clear the path of movement of the unit received by said conveyor.

28. In a machine of the class described, the combination with a tank containing a mass of plastic material and having an arcuate wall extending upwardly from the bottom thereof, a fixed die, there being a discharge opening in said tank, a selecting arm, a selecting die on said arm for selecting a unit of material from said mass and locating it adjacent to said fixed die in position to be discharged through said discharge opening, and means for actuating said selecting arm to cause said selecting die to pass through a path of movement adjacent to said arcuate wall, the curve of the arcuate wall receding from the path of movement of the selecting die as it extends upwardly, whereby the friction caused by the movement of said selecting die will be reduced to a minimum.

29. In a machine of the class described, the combination with a tank containing a mass of plastic material having an arcuate wall extending upwardly from the bottom thereof, there being a discharge opening in said tank at the lower end of said arcuate wall, means for selecting a unit of material from said mass and locating it in position to be discharged through said discharge opening, said selecting means including an arm, and means for actuating said arm to pass its free end through a path of movement adjacent to said arcuate wall, the curve of the arcuate wall receding from the path of movement of the free end of said arm as it extends upwardly.

30. In a machine of the class described, the combination with a plastic mass receiving container having a discharge opening at its lower end, of a closure for said discharge opening, the upper surface of which closure serves as a support for a unit of confection to be discharged, a plunger slidably mounted to discharge the unit of confection positioned above said discharge opening, means for operating said closure to free the discharge opening in order to permit said plunger to discharge the unit positioned above said discharge opening, and means for causing said plunger to rise when said closure is caused to open to effect a sucking action on the unit of material disposed above said discharge opening temporarily to hold up the unit of material disposed above said discharge opening until the closure has entirely cleared the discharge opening to facilitate the movement of the closure.

WILLIAM BARTLETT LASKEY.